Patented June 4, 1935

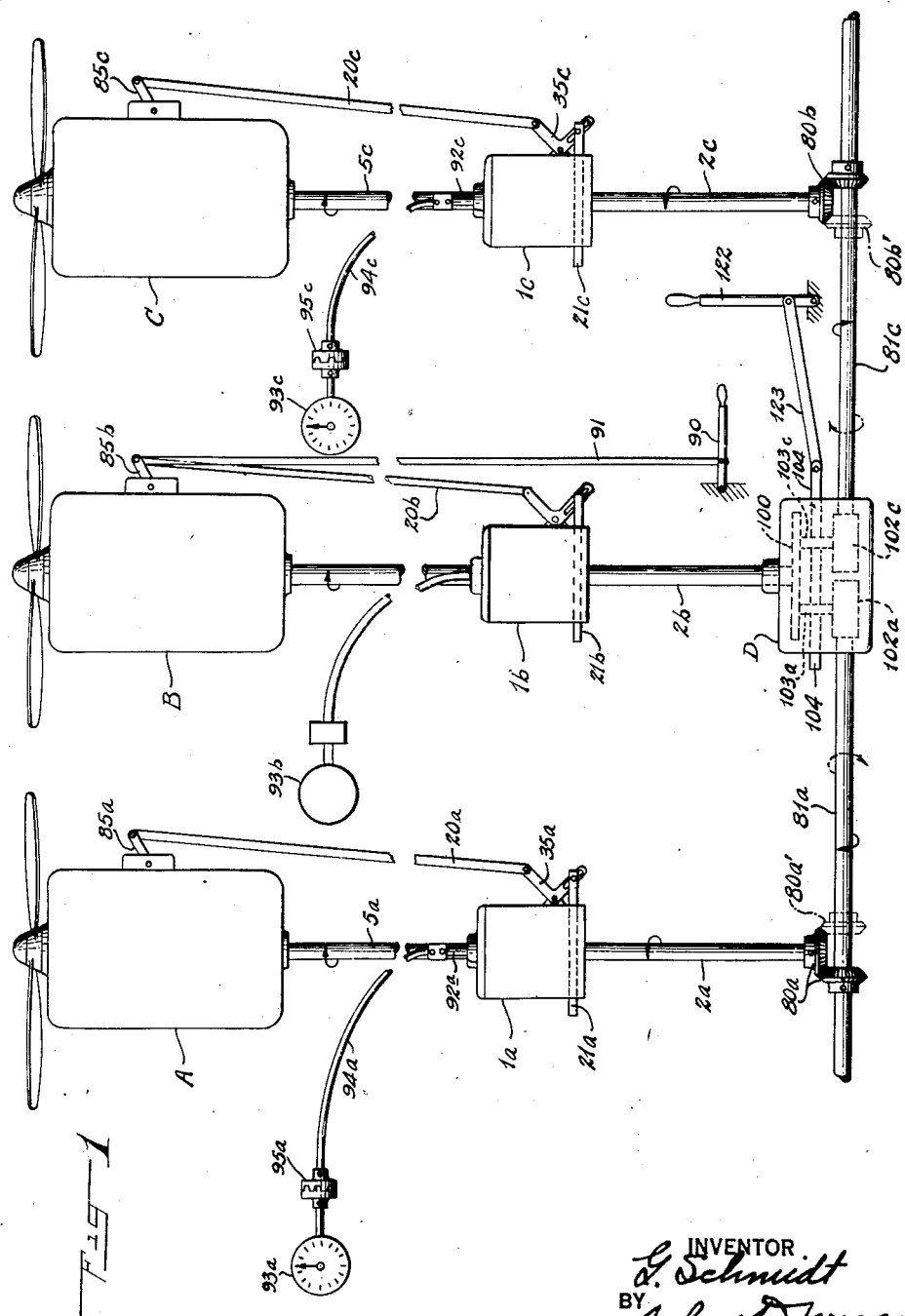

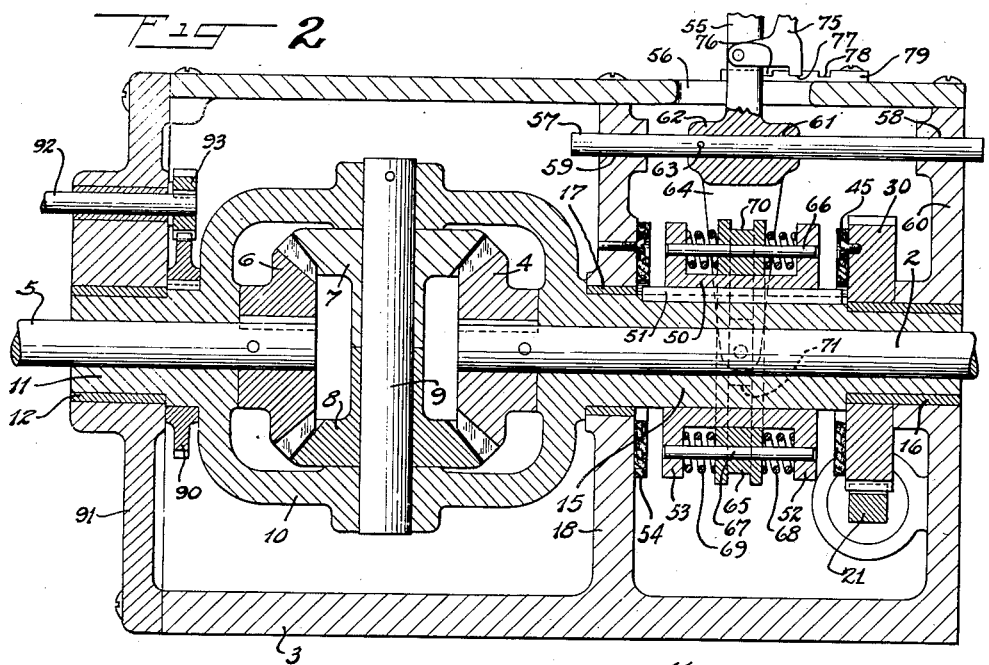
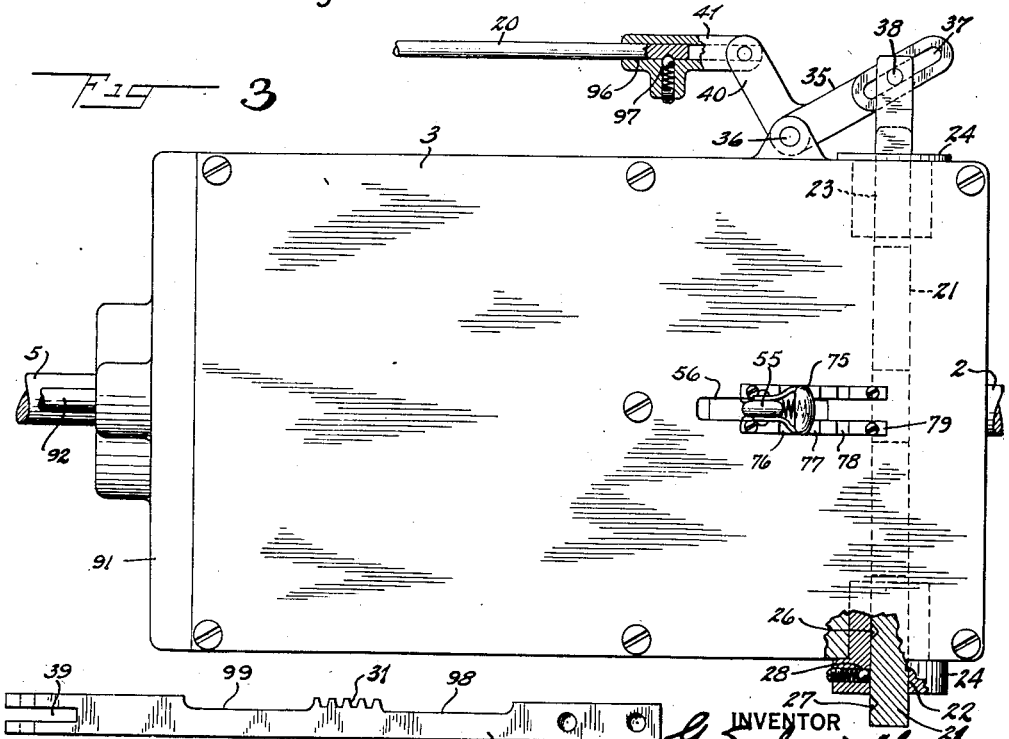

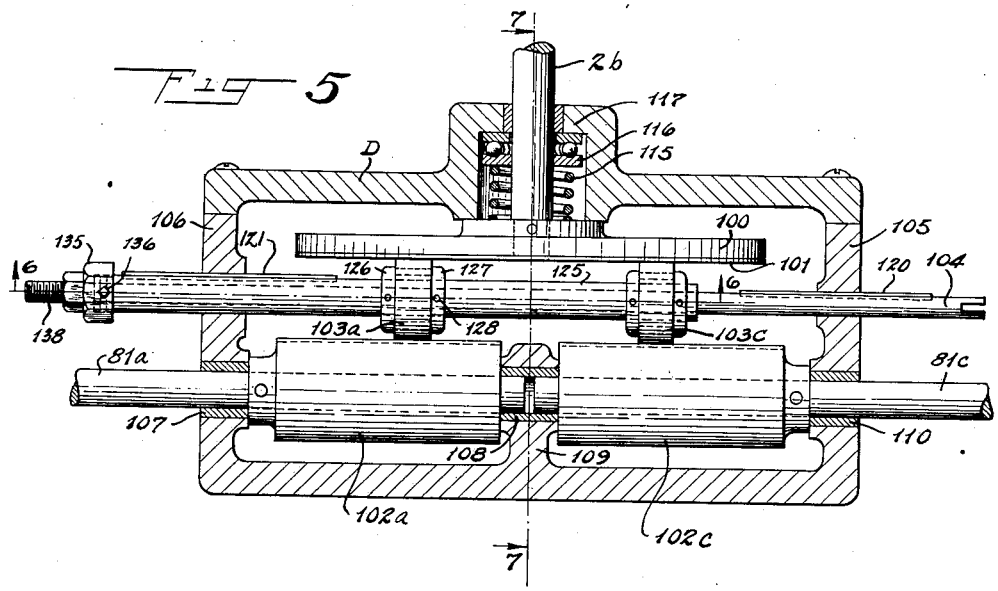
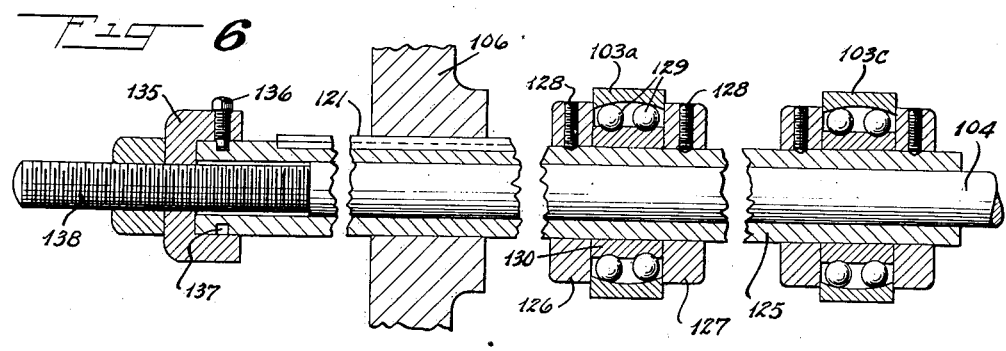
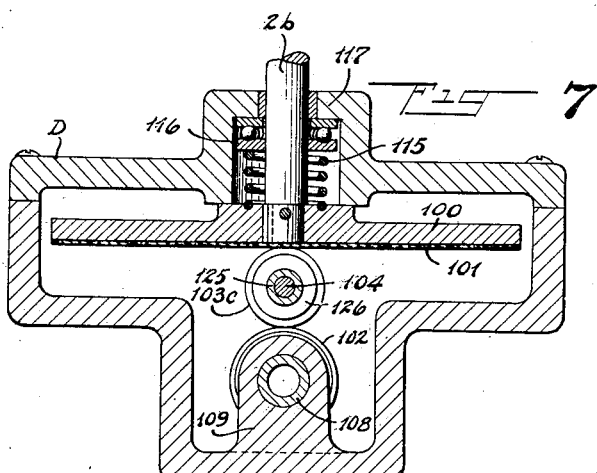

2,003,558

UNITED STATES PATENT OFFICE 2,003,558

METHOD AND MECHANISM FOR GOVERNING ROTATING BODIES

Grayson Schmidt, Fort Monroe, Va., assignor of one-half to Harry F. Townsend, Fort Mills, P. I.

Application June 5, 1930, Serial No. 459,408
Renewed August 30, 1934

REISSUED

12 Claims. (Cl. 60—97)

The invention relates to a novel and useful method and mechanism for controlling the angular velocity of a rotating body or bodies. More particularly, the invention relates to such a method and mechanism for controlling a motor or plurality of motors and maintaining them in synchronous rotation with a master motor or other standard rotating member.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a partially diagrammatic or schematic showing in plan of a preferred embodiment of the invention, showing its application to the motors of a tri-motor airplane;

Fig. 2 is a vertical transverse section of a unit synchronizing device;

Fig. 3 is a top plan of the mechanism shown in Fig. 2;

Fig. 4 is an enlarged detail of the control rack of a unit synchronizing device;

Fig. 5 is a transverse vertical section of a variable speed mechanism;

Fig. 6 is an enlarged fragmentary vertical section of the shaft and rollers of the variable speed mechanism, taken on line 6—6 of Fig. 5, and Fig. 7 is a vertical section taken on line 7—7 of Fig. 5.

The invention provides a novel and useful method and mechanism for controlling or governing the angular velocity or rotation of a rotating body or bodies, such as internal-combustion motors, turbines, or any other mechanisms which have rotary motion or a motion which can be converted into rotation for the purposes of such control. The invention is further directed to a novel and useful method and mechanism for indicating the variations in angular velocity between two rotating bodies.

The novel method of the invention broadly comprises detecting and determining or measuring the differences between the rotary speed of a master or standard rotating body and that of the body or bodies to be controlled, and automatically changing the rotary speed of the latter so as to eliminate such differences.

One fundamental object of the invention is to provide a method and means for accurately determining the actual differences in rotary velocity of two rotating bodies and, if desired, indicating such differences visually or otherwise, as well as utilizing the determined differences for automatic governing of said body or bodies.

The invention finds an extensive field of present usefulness in the control and automatic synchronization of the motors of multi-motored machines such as airplanes and motor boats, although it will be understood that the principles of the invention are broadly applicable to the control of any rotating body or bodies. One notably useful and exemplary embodiment of the invention is illustrated in its application to a multi-motored airplane. Most of the larger modern airplanes have two or more internal-combustion motors, the number of such motors sometimes being as great as twelve in more recently developed planes. In the piloting of multi-motored airplanes, it is very important that the different motors rotate in synchronism, i. e., at the same R. P. M., so that all propellers will exert the same driving force on the plane and proper flying balance can be maintained. For example, in a tri-motored plane it is essential that the two outlying motors rotate at the same angular velocity or R. P. M., during normal flying conditions on a straight course, or otherwise there will be a lateral turning moment about the lagging motor.

Present methods of maintaining a plurality of motors, such as airplane motors, in synchronism are very crude and unsatisfactory. In many instances the pilot roughly "tunes" the motors by ear, while at best the tuning is done by observing different tachometers which record the actual R. P. M. of the respective motors and manually controlling the respective motor throttles in accordance with the differences in tachometer readings. Neither of these methods is satisfactory, even for a bi- or tri-motor plane, and in planes with greater numbers of motors, accurate motor synchronization by such methods is virtually impossible.

By virtue of the present invention it is possible to automatically maintain any number of motors in synchronized rotation, either at the same R. P. M., or at any selectively predetermined and variable ratio of angular velocities. The motor or motors to be governed are preferably maintained in synchronous rotation with a standard or master motor, which may itself be one of the driving motors or a separate control motor alone, as desired. In the tri-motor plane, for example, the outlying or right and left motors may be governed by the rotation of the central motor so as to rotate at the same or a predeterminately proportional R. P. M., although this arrangement is merely illustrative and by no means fixed or essential.

The invention further provides a method and means for varying the angular velocity between a given motor and the master motor and/or other motors being controlled thereby. For example, in a tri-motor plane it is frequently desirable or necessary to drive one of the outlying motors at a different absolute R. P. M. from that of the other two, which two may themselves differ in actual velocity, while at the same time all three motors are maintained in predetermined ratios of angular velocity. The action of the tri-motor plane in making a "banked" turn is illustrative. In banking to turn to the left, for instance, the left wing drops and forms the pivot, so that it is desirable to drive the left or inner motor at a lower speed while the speed of the right or outer motor should be correspondingly accelerated. By virtue of the invention, it is possible to instantly vary the actual speeds of one or more of the motors as desired while maintaining all three in the desired predetermined ratio of velocities.

The present preferred mechanism embodying the invention comprises a device which is responsive to the actual differences in the rotary velocities of a master motor and the motor to be controlled and moves proportionately to said differences. The movement of the device is utilized to vary the rotation of the body or motor being controlled so as to bring it into synchronous rotation with the master motor and thus eliminate these differences in R. P. M.

Preferably, a master control shaft driven by or connected to rotate proportionately to the master motor, and a shaft driven by or rotating proportionately to the motor to be governed are connected by differential gearing. The housing or other portion of the differential gearing which normally idles in mesh with the driven gears is adapted to move proportionately to the differences in rotation between the master control shaft and the governed shaft. These movements of the differential housing are automatically transmitted to the throttle or other speed-control mechanism of the governed motor so as to speed up or slow down the motor and thus bring the gears of the differential into synchronism.

If desired, variable speed mechanism may be introduced between the master motor and the master control shaft driven therefrom, whereby the governed motor or motors may be rotated at a different absolute speed from the master motor but still kept in relative synchronism therewith.

Referring now in detail to the present preferred embodiment of the invention, illustrated by way of example in the accompanying drawings, the invention provides a unit controlling or synchronizing device 1, (Figs. 1, 2 and 3) which automatically detects and measures differences between the angular velocity of the standard or master rotating body or motor and the body or motor to be controlled. As embodied, the unit synchronizing device comprises an epicyclic gear train, preferably arranged in the form of a bevel gear differential (Fig. 2) although other forms of epicyclic gearing and differentials may be used. The arrangement of the differential gearing is such that one gear rotates with or is driven from the master or standard rotating body, a second gear being driven in the opposite direction from the body or motor to be controlled, while a third element of the gear train, in accordance with the principles of differential gearing, normally idles in mesh with the other two driven gears and moves proportionately to the differences in the angular velocities thereof.

As shown in Fig. 2, the shaft 2 is rotatably mounted centrally of the casing 3 of the unit synchronizing device, said shaft being driven from or rotating proportionately to the standard or master rotating body or motor. At the inner or free end of the shaft 2, is keyed a bevel gear 4 so as to rotate with the shaft. At the other or left hand end of the casing 3 is mounted a rotating shaft 5, preferably disposed parallel to and in line with shaft 2, and being driven from or rotating proportionately to a motor or other rotating body to be controlled. Said shaft 5 is mounted and driven to turn in the opposite direction from shaft 2. A bevel gear 6 is keyed to the inner end of shaft 5, similarly to gear 4.

As embodied, the bevel gears 4 and 6 form the active members of a differential gear train, which in addition comprises the cooperating idlers 7 and 8 which mesh with the upper and lower peripheries respectively of the gears 4 and 6. The idler gears 7 and 8 are mounted for free rotation about the vertical stub shaft 9, which is keyed to and forms a fixed part of the differential gearing housing 10.

The differential housing 10 comprises an extending sleeve 11 which projects to the left in Fig. 2 and forms a bearing for the shaft 5, which rotates therein. The sleeve 11 in turn is rotatably supported in the normally stationary casing 3 by bushing 12 formed in the left end thereof. A similar but longer sleeve 15 projects to the right in Fig. 2 and forms a rotatable support for the master shaft 2. The sleeve 15 is in turn rotatably supported in the housing 3 at the right hand end thereof by the bushing 16, and is supported at an intermediate point near the right hand end of the differential housing 10 by bushing 17 mounted in the intermediate web 18 of the housing 3.

It will be understood that, in accordance with the principles of operation of differential gearing, so long as the gears 4 and 6 turn at equal angular velocities in opposite directions, the gears 7 and 8 will turn idly about the stub shaft 9 and the differential housing 10 will remain stationary. However, if there is a difference between the angular velocities of the shafts 2 and 5, rotary movement will be imparted to shaft 9 and to the differential housing 10 proportionate to said difference in velocity. For example, if shaft 2 is rotating more rapidly than shaft 5, the increment in angular velocity imparted to gears 7 and 8 by gear 4 will be compensated for by a turning of shaft 9 and the differential housing about gear 6 as a pivot, and the amount of movement of the differential housing 10 will be proportional to said increment. If, on the other hand, the rotary velocity of shaft 5 exceeds that of shaft 2, the housing 10 will turn proportionately to said difference but in the opposite direction.

Means are provided for utilizing the movements of the differential housing 10 to control the rotation of shaft 5 or of the body or motor to be controlled, whereby the said differences in angular velocity of shafts 5 and 2 will be automatically eliminated. For example, if, as in the present illustrative embodiment, the rotating body to be controlled is an internal combustion motor by which shaft 5 is driven, the movement of differential housing 10 is transmitted to the throttle or other speed-control means for said motor so as to automatically speed up or slow down the motor and bring shaft 5 into synchronous rotation with shaft 2.

It will be understood, however, that the machine or other moving body connected to shaft 5 need not necessarily have a rotary motion. It is only necessary that the motion of such machine or motor be capable of transmitting rotary motion to shaft 5. For example, the machine to be controlled might be a reciprocating engine, having shaft 5 driven by rotary connection with a flywheel or the like.

As embodied, the movement of differential housing 10 may be transmitted through the integral sleeve 15 to a control-rod or lever 20 which is connected to the throttle or speed-control mechanism of the motor or other mechanism to be governed. The present preferred mechanism for actuating control-rod 20 from the rotatable sleeve 15 comprises a rectilinearly movable rack 21 which is slidably supported at 22 and 23 in suitable bushings 24 set into the housing 3. Rack 21 receives its motion from rotatable sleeve 15 through the pinion 30 rotatably mounted about sleeve 15 at the inner end of bushing 16, the teeth of said pinion normally meshing with teeth 31 on the rack.

The rack 21 is connected to control-rod 20 for imparting movement thereto by means of a bell crank lever 35 pivotally mounted to the casing 3 at 36 and having a pivoted connection with the end of rack 21 through the slot 37 and pin 38. The end of rack 21 is forked at 39 to receive the slotted end portion 37 of the bell crank 35. The other arm 40 of the bell crank is pivotally connected to the end of control rod 20 by means of sleeve 41, the detailed construction of which will be hereinafter described.

Means, such as a clutch mechanism, is provided for optionally or selectively transmitting the motion of the differential housing 10 and integral sleeve 15 to the control-rod 20 as desired. As embodied, the pinion 30 is mounted for free rotation about sleeve 15, but has on its inner or left hand face a frictional clutching surface comprising the annular friction member 45. A cooperating clutching member driven by the sleeve 15 is provided for transmitting the rotation of sleeve 15 to pinion 30. As embodied, a cylindrical collar 50 is mounted about the sleeve 15 to rotate therewith, but is slidable therealong, being connected to the sleeve 15 by the spline 51 which cooperates with a suitable groove in the collar member 50.

The collar 50 is provided with a clutching face for engaging with the frictional ring 45, said face comprising the outer or right hand flanged portion 52 of the collar 50. The inner or left hand end of the collar 50 is similarly constructed, having a widened flange 53, the inner face of which is adapted for clutching connection with the annular clutching member 54 which is fast to the outer or right hand face of the web 18 of the casing 3. The purpose and operation of this construction will be described in detail hereinafter.

Means are provided for variably positioning the clutching collar 50 with respect to sleeve 15. As embodied, a control lever 55 extends through a slot 56 in the upper surface of the casing 3 (Figs. 2 and 3) and is supported for translation with respect to the casing 3 on the slidable rod 57, which rod is mounted for sliding movement at 58 and 59 in the end wall 60 and the web 18 respectively of the casing 3. The rod 57 passes through a suitable opening 61 in the enlarged portion 62 of the lever 55, being fixed with respect to said lever by a pin 63. The lower end of the lever 55 is forked to form a yoke about the clutching collar 50, the arms 64 of the yoke being slidably connected to the rotatable collar 50 by means of the grooved ring 65 which surrounds the collar 50 at the central portion thereof. The ring 65 is mounted to rotate with the collar 50 by means of pins 66 and 67 which extend through suitable openings in the ring and are supported at their outer and inner ends respectively in the flanges 52 and 53 of the collar 50. The ring 65 is slidable along the rods 66 and 67, but is prevented from free sliding movement by helical compression springs 68 and 69 which are positioned about the pins 66 and 67 and bear against the faces of the ring 65 and the inner faces of the flanges 52 and 53 respectively.

The ring 65 is provided with a peripheral groove 70. Either arm 64 of the yoke on lever 55 is provided with an arcuate member 71 which rides in the groove 70 and is fixed to the lower end of its arm 64. Thus translatory movement of the lever 55 parallel to the axis of shaft 2 will carry the collar 50 and its cooperating structure along sleeve 15 and into engagement with one or the other of the clutching faces 45 or 54. Rotation of collar 50 with respect to the ends of the yoke 64 is permitted by the free rotary connection between the arcuate members 71 and the grooved ring 70.

In the present embodiment of the invention, the clutching member 50 has three alternative positions. As shown in Fig. 2, member 50 is located at an intermediate position on the sleeve 15, in which position there is no contact with either of the clutching members 45 or 54. Movement of the positioning lever 55 to the right will carry the clutching mechanism 50 along to the sleeve 15 and into driving contact with the pinion 30, while movement of the lever 55 to the left will carry the clutching face of flange 53 into frictional clutching contact with the member 54. In the following description, the right hand or driving position of the clutch will be designated as the "governing" position; the left hand setting of the clutch as its "locked" position; and the intermediate or freely rotating position shown in Fig. 2 will be called the "neutral" position.

Means are provided for locking the clutching mechanism 50 in any one of the three positions enumerated above. Any known or suitable mechanism may be used for this purpose, the means shown comprising a spring-pressed dog 75 pivotally mounted on the handle of lever 55, and adapted to cooperate with the locking grooves 76, 77, and 78 in the plate 79 on the top of the casing 3 for holding the clutch in the locked, neutral or governing positions respectively. It will be noted that the springs 68 and 69 serve the usual function of a spring clutch in permitting gradual increase of clutching pressure between the clutch faces, so that when the lever is locked in one of the notches 76 or 78, the cooperating springs 69 or 68 are under compression. These springs also act to center the clutch and tend to return it to "neutral".

It will be clear from the foregoing description that when the clutch 50 is in the right hand or governing position, any motion of the differential housing 10, resulting from differences in angular velocity of the shafts 2 and 5, will be automatically transmitted to the pinion 30 and rack 21 and through them to the throttle-control rod 20.

Referring now to those features of the invention for automatically controlling the angular velocity of a rotating body, such as a gasoline motor, and for maintaining the same in synchronous rotation with a standard rotating body or master motor, such use of the unit synchronizing device will be described in connection with the synchronous control of an airplane motor, although it will be understood that the invention is by no means limited to such use and is broadly applicable to many other types of mechanisms, the following description being merely by way of illustration and example. Referring to Fig. 1, the motors A, B and C of a tri-motor airplane are diagrammatically indicated, each motor being shown with its propeller in direct connection with the motor shaft. For the present description we will limit our consideration to motors B and A, assuming that B is the master motor and A the motor to be controlled and automatically maintained in synchronous rotation with the master motor B.

In accordance with the invention, the throttle of motor A is to be automatically controlled by a unit synchronizing device so as to automatically speed up or slow down motor A and thereby eliminate differences between the velocity thereof and that of master motor B. As embodied, a shaft 5a is provided extending from motor A and being driven preferably directly from the main shaft thereof.

The shaft 5a is connected to a unit synchronizing device 1a, which is similar in construction and operation to the unit synchronizing device 1 already described in connection with the mechanisms shown in Figs. 2 and 3. It will be understood that the parts in Fig. 1 marked with the same reference numerals as those used in describing the unit synchronizing device, but bearing the lettered suffix (1a, 2c, etc.) indicate parts pertaining to motors A, B and C, but having the general constructions and operations of the similarly numbered parts of the unit synchronizing device already described.

A shaft 2a is driven from the master motor B so as to rotate proportionately to the rotary velocity thereof and in the opposite direction from shaft 5a. As shown, shaft 2a is driven by bevel gearing 80a from shaft 81a which is connected for direct driving from shaft 2b. Shaft 2b is preferably driven from the main shaft of master motor B. For purposes of the present description, the driving connection D actually shown between shaft 2b and 81a should be disregarded and it should be assumed that the driving connection from shaft 2b to 81a is a direct driving connection, such as a 1 to 1 bevel gearing similar to 80a.

The unit synchronizing device 1a is provided with the rack 21a, which is connected by bell crank 35a to the throttle control rod 20a for motor A. As shown, control rod 20a is connected to the throttle 85a of motor A so as to directly move the same proportionately to the movement of rack 21a and thus transmit the motion of the differential housing incorporated in the unit synchronizing device 1a to the throttle of motor A.

The motor C may be similarly synchronized with the master motor B, the embodied mechanism comprising the unit synchronizing or control shaft 81c driven from the master control shaft 2b, and driving directly the shaft 2c which is connected in the manner hereinbefore described with the gearing of the unit synchronizing device 1c. Shaft 5c is driven from motor C and connected to the unit device 1c, the parts 21c, 20c and 85c being constructed and operated in a manner identical with the correspondingly indicated parts of the mechanism for motor A.

Master motor B may be provided with a manually controlled throttle, pivoted lever 90 being attached to control-rod 91, which is connected to the throttle 85b of motor B.

It will be understood that the number of motors controlled by and synchronized with the master motor B is not limited to the two motors A and C shown. The unit control shafts 81a and/or 81c may be extended and as many motors attached thereto and controlled thereby as may be desired. Each motor so controlled would, of course, be provided with a unit synchronizing device constructed and connected to its respective motor to be controlled in the same manner as devices 1a and 1c.

It will further be understood that the master motor B need not necessarily be a large or standard driving motor, although in the case of a tri-motor airplane or the like, one of the regular driving motors will ordinarily be used for the master motor. However, for the purposes of my invention, the unit synchronizing shafts 81a and/or 81c could equally well be driven by a small motor or other standard rotating body which would be used solely or principally for the purposes of synchronous control.

The operation of the hereinbefore described mechanism may be briefly stated as follows:

Let it be assumed that unit control shafts 81a and 81c are driven at equal velocities from shaft 2b of motor B. Further, assume that the clutches of both unit synchronizing devices 1a and 1c are set in the "governing" position. With these settings, any difference in R. P. M. between shafts 5a and 2a will be instantly transmitted to the control rack 21a of unit 1a and through said rack to the throttle of motor A. Thus if motor A is lagging and the R. P. M. thereof is less than that of motor B, rack 21a will be moved to the right so as to advance the throttle of motor A and thus speed up the motor. As soon as synchronous rotation is achieved between shafts 5a and 2a, the movement of rack 21a will automatically cease. If, on the other hand, motor A is turning at greater R. P. M. than motor B, the unit synchronizing device will automatically throttle motor A and reduce its speed the desired amount. Corresponding operations, of course, will take place in the control of motor C.

It will likewise be clear that if the throttle of motor B is advanced and the speed thereof increased, the unit synchronizing devices 1a and 1c will automatically advance the throttles of their respective motors A and C. In this way, an automatic and synchronous control of the speed of any desired number of motors can be obtained merely by the manual operation of the speed-control or throttle of the master motor.

Means are provided for throwing out the synchronous control, and permitting one or more of the motors to run individually and independently of the master motor. As embodied, the clutch mechanisms of the unit synchronizing devices 1a and/or 1c may be set in the intermediate or "neutral" position. With the neutral settings, the differential housings of the unit synchronizing devices will not transmit their movements to the racks 21a and 21c, so that no movement will be transmitted to the throttles of motors A or C. As a result, any or all of the motors A, B and C may be run independently of each other regardless of the respective differences in rotation of shafts 5a, 2b and 5c.

In accordance with one feature of the invention, the relations of the master motor and motor or motors under control thereof may be interchangeable so that the master motor will be governed or controlled and one of the other motors will become the master motor. As embodied, the master motor B may be also provided with a unit synchronizing device 1b which is connected in the usual manner to shaft 2b, the latter being formed in two parts and said parts connected by the differential gearing of the unit synchronizing device 1b. The throttle 85b of motor B may be provided with an alternative automatic control rod 20b, connected to the control rack 21b of the unit synchronizing device 1b.

When the master motor shaft 2b is thus provided with a unit synchronizing device 1b, it is necessary that the clutch of said device 1b be set in the "locked" position in order that the motor B may operate as the master motor. The reason for this will be made clear by referring to Fig. 2 and assuming that the clutch mechanism 50 has been moved to the left hand or locked position with the dog 75 set in notch 76 and the clutch face engaging the clutching ring 54. With such clutch setting, the differential housing 10 will be locked and cannot turn. The result of such locking will be that the shaft 5 (in the present example the upper portion of shaft 2b in Fig. 1) will transmit its driving force directly to shaft 2 (the lower portion of shaft 2b) turning said shaft at the same speed but in the opposite direction. In other words, the unit synchronizing device will operate as a simple reversing gear when in the "locked" position.

It will be understood that in the preferred or usual arrangement for a multi-motor installation, all motors will be provided with unit synchronizing devices so that interchangeability in the relations of master motor and controlled motors can be accomplished simply by shifting the clutches on the unit synchronizing devices of two or more motors. In the example just described, where motor B is operating as the master motor and the clutch of unit synchronizing device 1b is in the locked position, the lower portion of shaft 2b will turn at the same R. P. M. as the upper portion, but in the opposite direction. In order to impart the proper direction of turning to shafts 2a and 2c, so that motors A, B and C will all drive in the same direction, the bevel gearings 80a and 80b would be reversed in their settings on shafts 81a and 81c, (as shown by the dotted gears 80a' and 80b'), it being understood that the directions of turning of shafts 81a and 81c would be those shown by the dotted arrows, due to the reversed drive from the lower portion of shaft 2b.

If it is desired that motor A, for example, be set to operate as the master motor and motors B and C be controlled thereby, the clutch of synchronizing device 1b will be set in the "governing" position and the clutch of device 1a will be set in the "locked" position, thereby making the drive of shafts 81a and 81c come from shaft 2a of motor A. When motor B is set to operate as a controlled motor, the throttle thereof will be actuated automatically by rack 21b and control rod 20b.

Means are provided for indicating, visually or otherwise, the relative differences in rotation between a motor being controlled and the master motor or other rotating standard. As embodied, the motion of the differential housing 10 of a unit synchronizing device (Fig. 2) may be utilized to indicate the actual differences in synchronism between the master motor and the motor to be controlled. For this purpose, a spur gear 90 may be keyed to the rotatable sleeve 11 of the differential housing 10, said gear being positioned between the left hand end of the differential housing 10 and the end wall 91 of casing 3. An indicator shaft 92 is rotatably mounted in said end wall 91 above and parallel to shaft 5, and is driven by spur gear 90 through the pinion 93 keyed to the inner end of shaft 92.

Means are provided for visually indicating the amount and direction of rotation of shaft 92 to thereby indicate the differences in rotary velocity between the motor to be controlled and the master motor. As shown in Fig. 1, a visual indicating device 93a is connected to shaft 92a of unit synchronizing device 1a, the connection preferably being made by means of a flexible shaft 94a or similar suitable mechanism for transmitting the motion of the shaft 92a to the indicating device, regardless of where the latter may be located.

The visual indicating device 93a, which for convenience of nomenclature may be hereinafter called a "synchro-indicator", may be of any suitable or known construction for the purposes to be accomplished. For example, the synchro-indicator may be an ordinary pointer and dial which will measure and indicate the amount of rotation of the differential housing of the unit synchronizing device 1a. If the pointer remains stationary, it would indicate that motor A and motor B were in synchronism, while the difference in synchronism would be indicated by the speed at which the pointer turned. Clockwise motion of the pointer would indicate that motor A was rotating faster than motor B while counter clockwise motion would indicate the reverse. This could be accomplished, for example, by using a magnetic type speedometer for indicating both right and left positions over a scale having zero in the center, right signifying slow and left fast or vice versa, the graduations to read revolutions per minute.

The invention is not limited to any type of indicating device, the important feature being that indication is automatically made of the actual differences in R. P. M. of the two motors connected to the unit synchronizing device.

In certain cases it may be desirable to utilize the principles of my invention solely for the purpose of indicating differences in R. P. M. of rotating bodies. In such case the unit synchronizing device could be set in the neutral position and the sole function of the device would then be to actuate the synchro-indicator pointer. Such indication could be used by the operator for manually controlling and synchronizing the motors. On the other hand, the synchro-indicator will also operate while automatic governing of the motor A is taking place through the control of the throttle by the unit synchronizing device.

Means are provided for rendering the synchro-indicator non-recording. As embodied, a clutch 95a may be provided in the drive of the synchro-indicator 93a for detaching the same from the drive of shaft 92a. With this clutch disconnected, the unit synchronizing device would continue to control the throttle of motor A (assuming the device to be set in the governing position) while no indication would be made by the synchro- indicator.

In accordance with one feature of the invention, safe-guards are provided for preventing harmful or continued automatic operation of the motor-control devices in the event of abnormal or accidental occurrences in the operation of the system. For example, the invention provides devices for preventing undue movement of the throttle of a governed motor in the event that such motor goes dead while being controlled automatically from the master motor. Referring for the sake of illustration to motors A and B, when B is the master motor throttle 85a of motor A is automatically moved to accelerate motor A whenever the R. P. M. thereof falls below that of the motor B. Normally the lack of synchronization between motors A and B will be relatively slight and quickly corrected, so that the movements of the throttle 85a will usually be of little magnitude. However, if motor A suddenly stalls, the automatic operation of unit synchronizing device 1a would operate to throw the throttle 85a wide open and would continue to force the rack 21a and the throttle control rod 29a in the throttle-opening direction.

The invention provides mechanism for preventing movement of the throttle beyond its normal limits of opening and closing. As embodied, the throttle-control rod 20 (Fig. 3) is connected to the end 40 of bell crank 35 by a sleeve 41 provided with a socket 96 which receives and supports the end of rod 20, which normally stops short of the right hand end of the socket. Rod 20 is releasably held in its normal position in sleeve 41 by a spring pressed ball and socket device 97. For all normal movements of rod 20 in controlling a motor throttle, the spring pressed ball device 97 will suffice to hold rod 20 in position. However, if the rod 20 encounters more than the usual opposition in its movement (as when the governed motor stalls and the throttle has been moved to its outer limit) the rod 20 will slide over the ball and permit further movement of the bell crank in either direction.

Additional safe-guard means are provided for preventing undue or abnormal movement of the control rack 21 of the unit synchronizing device. For example, in the case of a stalled motor, it is desirable that the rack 21a be disconnected from the driving action of the differential housing 10 when or soon after the throttle control-rod 20 has reached the limit of its motion. As embodied, the rack 21 is provided with a limited number of gear teeth 31 disposed near its central portion (Fig. 4). On either side of the teeth 31 the rod is provided mutilated portions 98 and 99, so that movement of the rod beyond the teeth 31 will disconnect the rod from the drive of the pinion 30.

For maintaining the gear teeth 31 of the rack in register with the pinion 30, the lower end of rack 21 is provided with notches 26 and 27 which are spaced apart a distance substantially equal to that of the range of the gear teeth 31. A spring-seated locking ball 28 is maintained against the surface of rack 21 and is adapted to slip into either notch 26 or 27 and prevent further movement of the rack. By virtue of this construction undue movement of the rack beyond the range of the teeth 31 is prevented, so that as soon as the teeth 31 are thrown beyond the driving contact of the pinion 30, so that there can be no further actuation of the rack, the rack will stop and register and re-engagement of the pinion teeth will be easily effected.

While the hereinbefore described safety guard mechanisms have been mentioned in relation to the operation of the system in the event that the governed motor stalls, it will be understood that these devices also operate to prevent malfunctioning of the system in the event that the master motor stalls. For example, the rack 21 is provided with mutilated portions on either side of the centrally disposed teeth 31 so that undue movement of the differential housing 10 in either direction will be rendered harmless.

In accordance with one feature of the invention, means are provided for varying the ratio of rotary velocities of the different motors to that of the master motor, while maintaining relative synchronous rotation of all motors. In the foregoing description, the assumption has always been made that the absolute rotary velocity of motors A and C should be maintained the same as that of motor B, i. e. a 1 to 1 speed ratio. However, in many cases it would be desirable to drive motor A and/or motor C at a different actual speed from that of motor B, while maintaining motors A and C in relative synchronism with the master motor B. In the case of a tri-motor airplane, for example, it is frequently desirable to vary the relative velocities of motors A and C while maintaining them in relative synchronism with the master motor B and with each other. An example of such a case would be in making a banking turn of an airplane. Assuming that motor A is the left hand motor of the plane, and the turn is to be to the left, it would be desirable to slow down motor A and speed up motor C during the turn.

For permitting relative speed variations between the synchronized motors, a variable speed mechanism D is provided between the master motor and the control devices for the motors to be governed. In accordance with the broad principles of the invention, the variable speed mechanism may comprise any known or suitable device for selectively varying the speed ratio of the shafts 81a, 2a, and/or 81c and 2c with respect to the speed of motor B as transmitted by shaft 2b.

A simple form of such mechanism is shown in Fig. 1, comprising the mechanism marked D therein. As embodied, the lower end of shaft 2b is provided with a circular disc 100 (Figs. 1, 5 and 7), the lower face thereof being covered with friction material 101. Driving force is transmitted from the disc 100 separately to shafts 81a and 81c, each of said shafts being provided at its end with a frictionally driven roller 102a and 102c, respectively. Means for transmitting driving force to the rollers 102a and 102c, comprises friction rollers 103a and 103c, interposed between the friction surface of disc 100 and the rollers 102a and 102c, respectively. As shown in Figs. 1, 5 and 7, rollers 103a and 103c are rotatably mounted on the non-rotatable shaft 104, the ends of which are supported by the end walls 105 and 106 of the casing D for the variable speed device. The rollers 102a and 102c are fixed to the ends of shafts 81a and 81c respectively, the surfaces of said rollers being preferably composed of leather or other friction material. Shaft 81a is rotatably supported in the end wall 106 of casing D by the bushing 107, while the inner end of shaft 81a is supported for rotation in the bushing 108 formed in the intermediate web 109 of the casing D. Shaft 81c is similarly supported by bushing 110 in wall 105 of the casing, the inner end of shaft 81c being supported likewise by bushing 108.

The friction disc 100, which is keyed to the lower end of shaft 2b, is pressed into yielding frictional engagement with the tops of rollers 103a and 103c by the helical spring 115 which surrounds the lower end of shaft 2b and presses against the lower face of the ball-bearing race 116. This race 116 supports the ball-bearings interposed between the spring and the lower face of collar 117 formed in the upper portion of casing D and surrounding the shaft 2b.

It will be clear from the foregoing that independent driving motion is transmitted from the face of friction disc 100 to rollers 103a and 103c and through them to rollers 102a and 102c respectively, thereby independently driving shafts 81a and 81c from the master motor. The rotary velocity imparted to roller 103a, for example, by disc 100 will depend upon the radial distance of the roller from the center of the disc. Therefore, it is possible to vary the rotary velocity of shaft 81a with respect to the speed of the master motor by merely varying the position of roller 102a with respect to the center of disc 100.

The invention comprises means for varying the positions of rollers 103a and 103c with respect to the disc 100 to thereby vary the relative driving velocities of shafts 81a and 81c. As embodied, shaft 104 is supported in walls 105 and 106 of casing D, being held from rotation with respect thereto by splines 120 and 121, which nevertheless permit longitudinal movement of the shaft.

The end of shaft 104 is pivotally connected to a control rod 123 which in turn is linked to a controlling lever 122, whereby movement of the lever will move roller 103a nearer to the center of the disc and roller 103c farther from the center thereof or vice versa.

Additional means are provided for varying the relative positions of rollers 103a and 103c with respect to disc 100 independently of the movement of shaft 104. As embodied, these rollers are actually mounted on a hollow sleeve 125 which surrounds the left hand portion of shaft 104 and is slidable with respect thereto, the spline 121 being actually set in said sleeve. Rollers 103a and 103c are normally fixed longitudinally of the sleeve by suitable collars 126 and 127 which are held in position by set-screws 128, the rollers being preferably mounted on ball-bearings 129 set in suitable supporting rings 130 on the sleeve 125.

Sleeve 125 is provided with mechanism for varying the longitudinal position thereof with respect to shaft 104, comprising a hexagonal screw-threaded cap 135 which is made fast to the end of sleeve 125 by a bolt 136 screwed through the side of the cap and projecting into a circular slot 137 in the sleeve. The left hand end of shaft 104 is screw-threaded as at 138, so that turning movement of cap 135 about shaft 104 will move the cap and the sleeve 125 axially of the shaft, it being understood that the circular slot 137 permits turning of the cap 135 about the end of the sleeve.

The operation and functioning of the variable speed mechanism D with respect to the other features of the invention, particularly in reference to the piloting of a tri-motor airplane, will now be described. As has already been mentioned, there are many instances in the piloting of a plane when it is desirable to drive one of the outlying motors (A for example) at a greater or less speed than the other outlying motor B. An example of a temporary condition requiring such speed variation in the motors is the making of a banking turn about motor A, in which instance it is desirable to slow down motor A and accelerate motor B.

By virtue of the mechanism hereinbefore described, the pilot would be able to make the desired speed variations in motors A and B by a temporary setting of the speed-change device B through lever 122. That is, by moving lever 122 to the right, rollers 103a and 103c would be slid to the right the desired distance, thereby varying their radial positions with respect to disc 100 and thus decreasing the speed of the former and increasing the speed of the latter. Consequently shafts 81a and 2a will slow down while shafts 81c and 2c will speed up a corresponding amount. The deceleration of shaft 2a will be transmitted to the throttle of motor A through the actuation of the unit synchronizing device 1a and the motor will be slowed down, while a corresponding acceleration will be imparted to motor C.

It will be clear that the deceleration and acceleration of motors A and C, respectively, will take place independently of the actual speed of motor B which will continue to run at the speed determined by its throttle setting. As soon as the banking movement has been completed, the pilot may return the lever 122 to its normal or central setting and normal synchronized driving of the three motors will be resumed. It is obvious, of course, that the pilot may vary the positioning of lever 122 and the setting of the variable speed device D during the banking movement of the plane so as to govern the relative speed variations of the motors as nicely as desired. For automatic operation of the speed variations in "banking", it may be desirable to connect the lever 122 or its equivalent to the "joy stick" or other device for controlling the position of the ailerons.

In many instances, particularly in the control of an airplane, it may be desirable to permanently or semi-permanently drive one or more of the governed motors at an increased or decreased speed ratio with respect to the master motor or the other governed motors, while maintaining relative synchronism with the master motor. In the case of the airplane, for example, the gyroscopic moment of the propellers, or other inherent forces, may induce a turning moment of the entire airplane to the right or left. To correct this, it would be desirable to always drive the right hand motor at slightly different speed from the left hand motor. By initially setting the rollers 103a and 103c along the shaft 104, by means of the screw-threaded adjustment of sleeve 125, it is possible to make a permanent or semi-permanent adjustment of the ratio of synchronization between the master motor and the motors A and C. Such an adjustment would normally be made independently of the temporary setting of lever 122, for the purpose of "trueing ship" or any other desired relative variation in the motor speeds.

It will be understood that neither of the speed variations described affects the speed of the center or master motor B, but only the relative ratio of synchronization between the master motor and the motor or motors being governed. In other words, the speed of the master motor is dependent solely upon the manual throttle control, while the speeds of the governed motors can be kept in a direct 1 to 1 ratio with that of the master motor or may be varied relatively thereto so as to get any desired speed ratio while maintaining automatic synchronization.

In certain cases, it might be desirable to vary the ratios of synchronization between one of the governed motors and the master motor independently of the other governed motors. This could be accomplished by making the rollers 103a and 103c independently slidable along sleeve 125 or shaft 104 so that the movement of one roller would not necessarily affect the positioning of the other with respect to the friction disc 100. Such a mechanism would be used in case it were desired to maintain motor C, for example, at the 1 to 1 ratio with the master motor B while driving motor A at a different ratio of synchronization. For the sake of clearness, no mechanism for independently varying the positions of rollers 103a and 103c along sleeve 125 has been shown, but it will be understood that means for effecting such variation and functions of such independent variations are within the scope of and are contemplated by my invention.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for synchronous motor control including in combination a master motor, a governed motor, means for maintaining the governed motor rotating at the same or a multiple of the speed of the master motor, and means for varying the speed ratio between the master motor and governed motor while maintaining the governing action between them.

2. A mechanism for synchronous motor control including in combination a master motor, a plurality of governed motors, means for maintaining the governed motors in synchronous rotation with the master motor, and means for varying the speed ratio between the master motor and one or more of the governed motors while maintaining the governing action between them.

3. A mechanism for synchronous motor control including in combination a master motor, a plurality of governed motors, means for maintaining the governed motors in synchronous rotation with the master motor, and means for varying the speed ratios of the governed motors with respect to each other while maintaining the governing action between the master motor and the governed motors.

4. A motor control system including in combination a plurality of motors, one of which is manually controllable, differential governing devices connecting the other motors with the manually controlled motor to maintain predetermined relationships between the angular speed of the manually controlled motor and the other motors, and means for selectively varying the speeds of the governed motors relative to each other.

5. A motor control system including in combination a plurality of motors, one of which is manually controllable, differential governing devices connecting the other motors with the manually controlled motor to maintain predetermined relationships between the angular speed of the manually controlled motor and the other motors, and manually operable, mechanical means for selectively varying the speeds of the governed motors relative to each other.

6. A motor control system including in combination a tri-motored aircraft, means for manually controlling the speed of one of the motors, means for automatically maintaining the speeds of the other motors proportionate to that of the manually controlled motor, and means adapted to be controlled by the steering mechanism of the aircraft for automatically varying the speeds of certain of said motors with respect to each other.

7. A motor control system for a multi-motored vehicle including in combination a manually controlled motor, a plurality of other motors, means for automatically maintaining the other motors at the same angular speed as the manually controlled motor, and means for selectively varying the relative speeds of said motors without interfering with said automatic means.

8. A motor control system for a multi-motored aircraft including in combination a plurality of propelling motors in an aircraft, means for maintaining the angular speeds of said motors equal or proportional to each other, means for increasing the speed of one of the motors and means for automatically decreasing the speed of another motor a proportionate amount.

9. A motor control system for a multi-motored aircraft including in combination a plurality of propelling motors in an aircraft, and means adapted to be controlled by the steering mechanism of the aircraft for automatically varying the proportionate speeds of said motors.

10. A motor control system for a multi-motored aircraft including in combination a tri-motored aircraft, means for manually controlling the speed of a center motor, means for automatically varying the speeds of the outlying motors proportionately to changes in the speed of the center motor, and means for independently varying the speeds of the outlying motors with respect to each other to assist in steering the aircraft.

11. A motor control system for a multi-motored vehicle including in combination a master motor, a governed motor, means for varying the speed of the master motor, governing means for imparting corresponding speed variations to the governed motor, and means for interchanging the relation of the motors whereby the original master motor may be governed by the other motor.

12. A motor control system for a multi-motored vehicle including in combination a master motor, a governed motor, means for varying the speed of the master motor, governing means for imparting corresponding speed variations to the governed motor, and means for interchanging the relation of the motors whereby the original master motor may be governed by the other motor, and means for optionally rendering said motors independent of each other.

GRAYSON SCHMIDT.